United States Patent
Gaudet et al.

(10) Patent No.: US 9,499,029 B2
(45) Date of Patent: Nov. 22, 2016

(54) WINDSHIELD ASSEMBLY FOR A VEHICLE

(71) Applicant: SOUCY INTERNATIONAL INC., Drummondville (CA)

(72) Inventors: Pascal Gaudet, Drummondville (CA); Stephane Genois-Pelletier, Drummondville (CA); Philippe Jaillet-Gosselin, Drummondville (CA); Vincent Morin, Saint-Hyacinthe (CA); Benoit Savage, St-Bonaventure (CA); Genevieve Therrien, Drummondville (CA); Mathieu Vincent, Drummondville (CA)

(73) Assignee: Soucy International Inc., Drummondville, Quebec (CA)

( * ) Notice: Subject to any disclaimer, the term of this patent is extended or adjusted under 35 U.S.C. 154(b) by 0 days.

(21) Appl. No.: 14/713,818

(22) Filed: May 15, 2015

(65) Prior Publication Data
US 2015/0328964 A1    Nov. 19, 2015

Related U.S. Application Data

(60) Provisional application No. 61/993,506, filed on May 15, 2014.

(51) Int. Cl.
*B60J 1/04* (2006.01)
*B60J 1/06* (2006.01)
*B60J 1/18* (2006.01)

(52) U.S. Cl.
CPC ..................................... *B60J 1/06* (2013.01)

(58) Field of Classification Search
CPC ............... B60J 1/02; B60J 1/04; B60J 1/06; B60J 1/007; B60J 1/004; B60J 1/008
USPC .......... 296/84.1, 89, 90, 96.1, 96.21, 190.1; 49/434
See application file for complete search history.

(56) References Cited

U.S. PATENT DOCUMENTS

| | | | | | |
|---|---|---|---|---|---|
| 1,835,405 | A | * | 12/1931 | Kaplan | B60J 7/067 296/219 |
| 1,960,601 | A | * | 5/1934 | Sullivan | B60J 1/14 454/128 |
| 5,096,253 | A | * | 3/1992 | Jo | B60J 1/04 296/190.1 |
| 6,293,616 | B1 | * | 9/2001 | Williams | B60K 37/00 280/DIG. 5 |
| 6,336,674 | B1 | * | 1/2002 | Gerisch | B60J 1/183 296/146.15 |
| 7,156,444 | B1 | * | 1/2007 | Da Silva | B60J 11/08 296/142 |
| 7,367,611 | B2 | * | 5/2008 | Fujii | B60J 1/02 296/107.07 |
| 2015/0076854 | A1 | * | 3/2015 | Salamon | B60J 1/04 296/96.2 |

* cited by examiner

*Primary Examiner* — Dennis H Pedder
(74) *Attorney, Agent, or Firm* — Robert Brouillette; Brouillette & Partners

(57) ABSTRACT

A windshield assembly generally configured to be used on off-road vehicles such as utility-terrain vehicles (UTVs) and side-by-side vehicles (SSVs) comprises a flexible and slidable windshield panel. The windshield assembly generally comprises at least two guide rails configured to be mounted to the vehicle and more particularly to the front and top portions of the cabin structure, and a flexible windshield panel which side edges are slidably mounted to the guide rails. By virtue of its sliding engagement with the guide rails, the windshield panel can be slid between an operative position, i.e. in front of the driver, and an inoperative position, i.e. into the top of the vehicle.

15 Claims, 19 Drawing Sheets

WINDSHIELD ASSEMBLY FOR A VEHICLE

CROSS-REFERENCE TO RELATED APPLICATIONS

The present patent application claims priority of U.S. Provisional Patent Application No. U.S. 61/993,506 filed at the United States Patent and Trademark Office on May 15, 2014 and entitled "Windshield Assembly for a Vehicle", the content of which is incorporated herewith by reference.

FIELD OF THE INVENTION

The present invention generally relates to windshield assemblies for vehicles and more particularly relates to windshield assemblies for generally off-road vehicles such as, but not limited to, utility-terrain vehicles (UTVs) and side-by-side vehicles (SSVs).

BACKGROUND OF THE INVENTION

Utility-terrain vehicles (UTVs), side-by-side vehicles (SSVs), golf carts, construction vehicles, and other similar off-road vehicles are typically provided without windshields. However, with the growing popularity of such vehicles, particularly UTVs, and SSVs, these vehicles are now being used in a much broader range of environments, some of which require the addition of a windshield.

Although vehicles equipped with removable and/or adjustable windshields are known (for instance in U.S. Pat. No. 8,292,355 B2 by Miller), such arrangements are often mechanically complex and impossible to remove and/or adjust during operation of the vehicle.

There is thus a need for a windshield assembly for use on off-road vehicles such as UTVs, SSVs, golf carts, and construction vehicles, which mitigates the shortcomings of prior art windshield assemblies for such vehicles.

SUMMARY OF THE INVENTION

The shortcomings of prior art windshield assemblies are generally mitigated by a windshield assembly which comprises a flexible windshield panel that can be selectively slid between an operative position and an inoperative position by a person present in the vehicle such as a driver/operator/passenger of the vehicle.

The invention is directed to a windshield assembly for a vehicle comprising a cabin structure having side edges, the windshield assembly comprising:
 i. at least two guide rails configured to be mounted to the side edges;
 ii. a flexible windshield panel slidingly mounted to the guide rails configured to slide between an operative position and inoperative position.

In accordance with a preferred embodiment, each guide rail may comprise a first generally straight portion extending along a front portion of the cabin structure, a second generally straight portion extending along a top portion of the cabin structure and a curved portion interconnecting the first and second portions. Preferably, a portion of the flexible windshield may be always extending along the curved portion.

In accordance with a preferred embodiment, the flexible windshield assembly is slidingly mounted with grooves of the guide rails configured to slidingly receive side edges of the flexible windshield panel.

In accordance with a preferred embodiment, the windshield panel is generally made from a flexible resistant material. Preferably, the flexible material comprises a thin sheet of flexible polymeric material. More preferably, the windshield panel comprises polycarbonate.

In accordance with a preferred embodiment, the windshield assembly may further comprise transverse support members configured to be mounted to the cabin structure of the vehicle.

In accordance with a preferred embodiment, in the operative position, the flexible windshield panel may be substantially located at a front portion of the cabin structure and wherein a lower edge of the flexible windshield panel abuts a front support member of the cabin structure.

In accordance with a preferred embodiment, in the inoperative position, the flexible windshield panel is substantially located on a top portion of the cabin structure and an upper edge of the flexible windshield panel abuts a top support member of the cabin structure.

In accordance with a preferred embodiment, a lower edge and the upper edge of the flexible windshield panel respectively comprise cushioning bands. Preferably, the cushioning bands are made of elastomeric material.

In accordance with a preferred embodiment, the windshield assembly comprises two flexible windshield panels and a double-side guide rail between the side edges of the cabin structure, each flexible windshield panel being slidably mounted to one of the guide rail mounted to a side edge and to one side of the double-side guide rail.

In accordance with a preferred embodiment, the windshield assembly may further comprise at least one handle.

In accordance with a preferred embodiment, the windshield assembly may further comprise a first locking mechanism mounted to a top support member of the cabin structure and a second complementary locking mechanism mounted to an upper edge of the windshield panel, the first and second locking mechanisms being configured to lock the windshield panel into the inoperative position.

In accordance with a preferred embodiment, the at least two guide rails of the windshield assembly may extend to a rear portion of the cabin structure and may further comprise a rear flexible windshield panel slidingly mounted to the guide rails and configured to slide between an operative position and inoperative of the rear flexible windshield panel.

In accordance with a preferred embodiment, the windshield assembly may further comprises at least two rear guide rails mounted to side edges of the rear portion of the cabin structure and may further comprise a rear flexible windshield panel slidingly mounted to the rear guide rails and configured to slide between an operative position and inoperative of the rear flexible windshield panel.

In accordance with a preferred embodiment, the windshield assembly may further comprise an assisting mechanism operatively connected to the flexible windshield panel for assisting the sliding movement of the flexible windshield panel.

The invention is also directed to a vehicle comprising a windshield assembly as defined herein. The vehicle may be a off-road vehicle such as a utility-terrain vehicle or a side-by-side vehicle.

Hence, a windshield assembly in accordance with the principles of the present invention generally comprises at least two guide rails configured to be mounted to the sides of the cabin structure (e.g. roll-cage) of the vehicle, and a flexible windshield panel slidingly mounted to the guide rails. The guide rails generally comprise a right guide rail and a left guide rail. The right guide rail is configured to be removably or permanently mounted to the right side of the cabin structure and such as to extend along the front and top portions of the cabin structure. Symmetrically, the left guide rail is configured to be removably or permanently mounted to the left side of the cabin structure and such as to extend along the front and top portions of the cabin structure. Notably, each guide rail comprises a first generally straight portion extending along the front portion of the cabin structure, a second generally straight portion extending along the top portion of the cabin structure, and a curved portion interconnecting the first and second portions For its part, the flexible windshield panel is mounted to the guide rails such as to be able to slide along them. In that sense, the right and left side edges of the windshield panel are respectively slidingly mounted into the right and left guide rails.

By virtue of its sliding engagement with the guide rails, the windshield panel can slide between an operative or close position, typically in front of the driver, and an inoperative or open position, typically above the driver.

To allow the windshield panel to flex along the curved portions of the guide rails, the windshield panel is generally made from a thin sheet of flexible polymeric material (e.g. polycarbonate). Still, despite being flexible enough to flex along the curved portions of the guide rails, the windshield panel needs to be rigid enough to absorb impacts and protect the driver.

In typical yet non-limitative embodiments, the windshield assembly also comprises transverse support members configured to be mounted to the cabin structure of the vehicle. In addition to providing structural integrity of the windshield assembly, these transverse support members generally insure that the guide rails are parallel and thus that the windshield panel can properly slide along them.

In typical yet non-limitative embodiments, the windshield panel comprises a handle to allow the driver to easily slide the windshield panel between the operative position and the inoperative position, and vice-versa.

Understandably, a windshield assembly in accordance with the principles of the present invention is not only generally simpler in construction, it also allows the driver to easily slide the windshield panel between the operative position and the inoperative position, even during operation of the vehicle.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF PREFERRED EMBODIMENTS

A novel windshield assembly for a vehicle will be described hereinafter. Although the invention is described in terms of specific illustrative embodiments, it is to be understood that the embodiments described herein are by way of example only and that the scope of the invention is not intended to be limited thereby.

Figure 1:
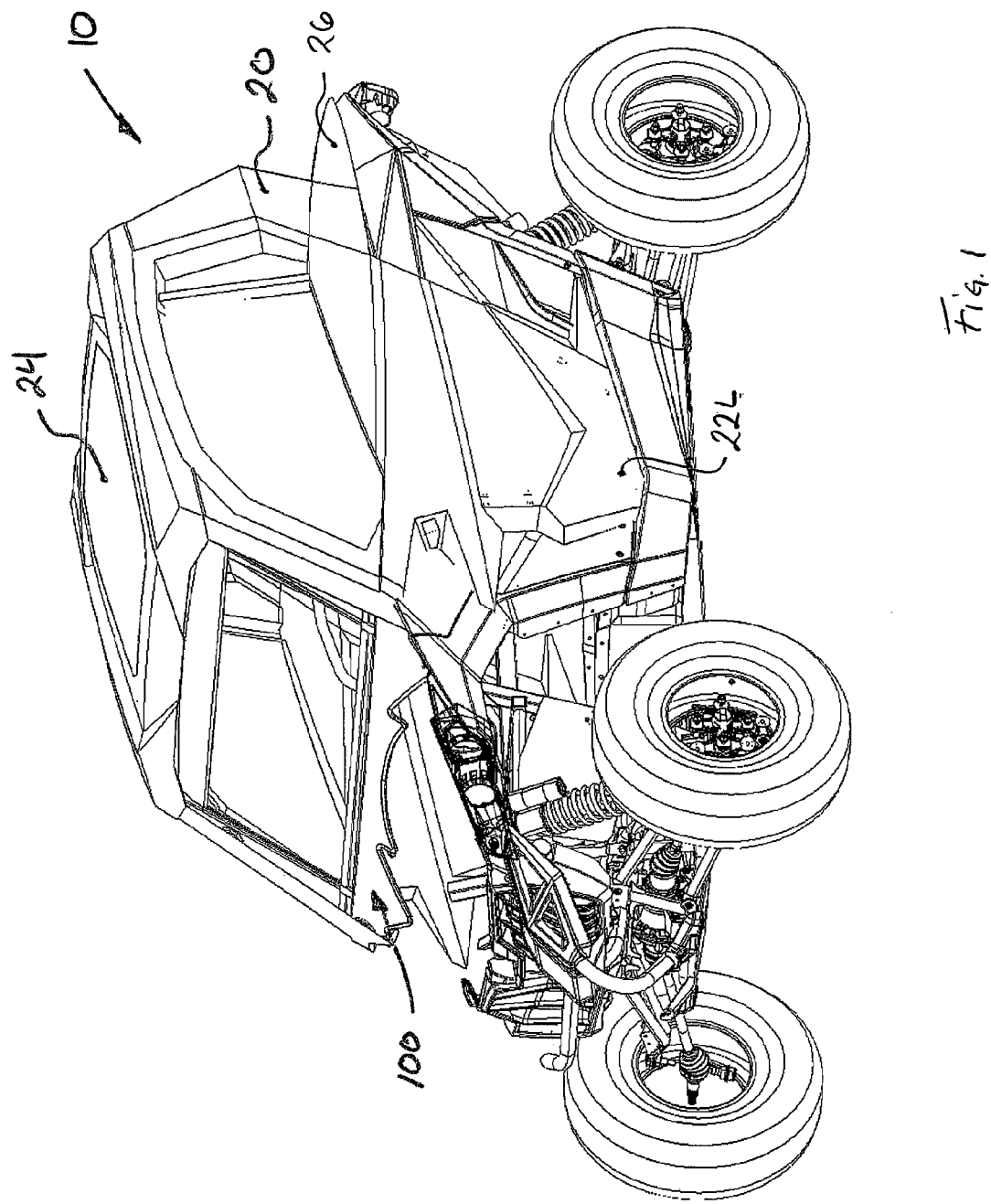
FIG. 1 is a front perspective view of a side-by-side vehicle (SSV) equipped with an embodiment of a windshield assembly in accordance with the principles of the present invention.
Figure 2:
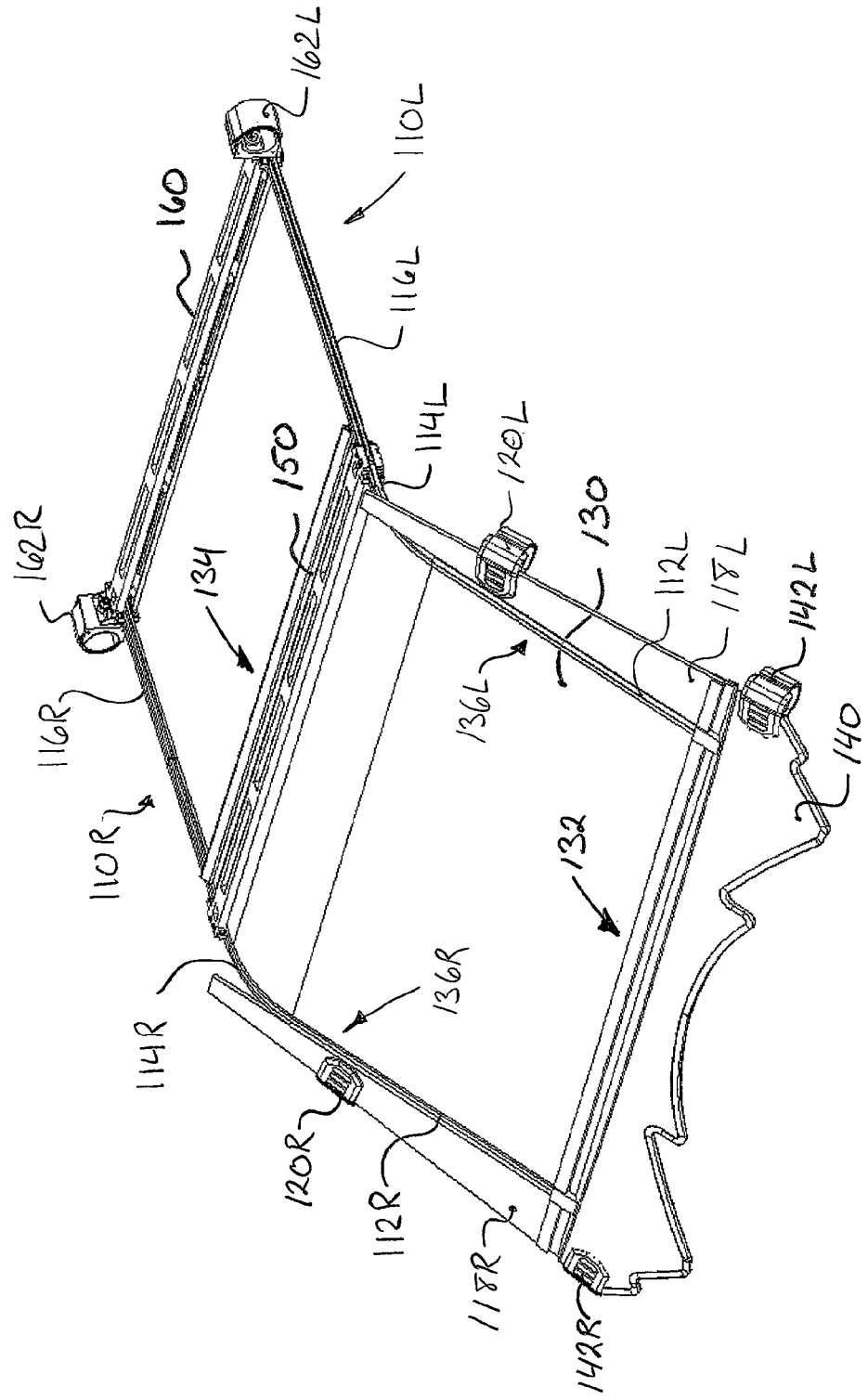
FIG. 2 is a front perspective view of the windshield assembly.
Figure 3:
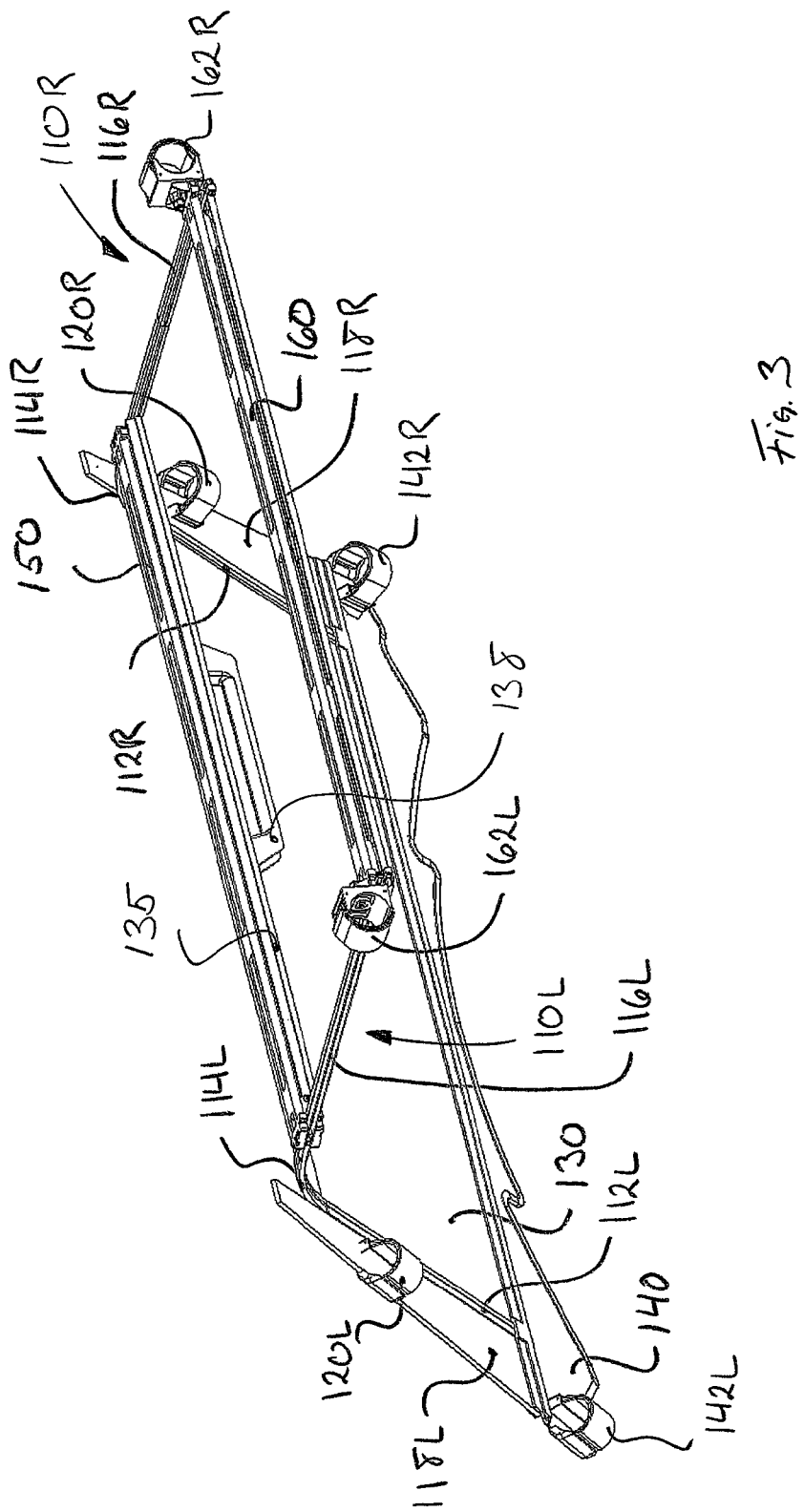
FIG. 3 is a rear perspective view of the windshield assembly of FIG. 2.
Figure 4:
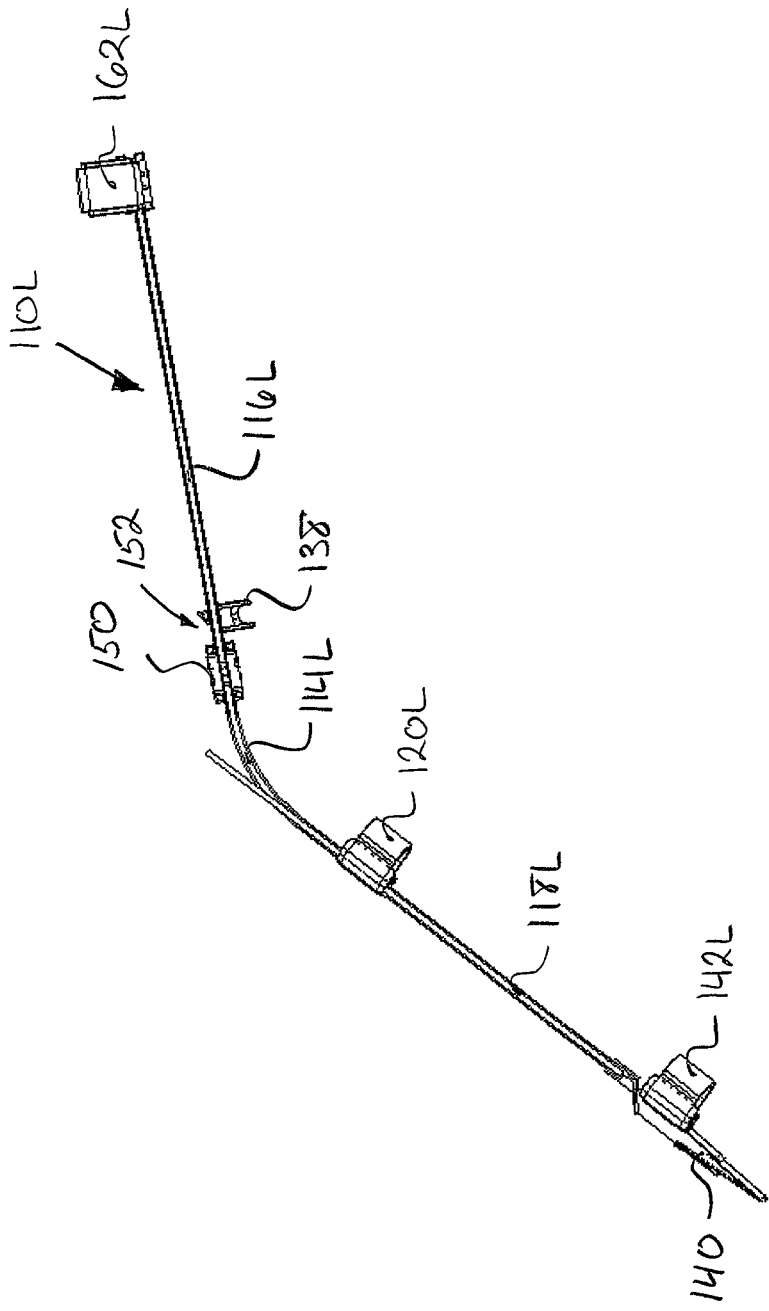
FIG. 4 is a left side view of the windshield assembly of FIG. 2.

Referring first to FIG. 1, an exemplary vehicle 10 is shown equipped with an embodiment of a windshield assembly 100 in accordance with the principles of the present invention. In FIG. 1, the vehicle 10 is a side-by-side vehicle (SSV). However, the windshield assembly 100 could be mounted to other types of off-road vehicles such as utility-terrain vehicles (UTVs), golf carts, and small construction vehicles (e.g. skid-steers).

Still referring to FIG. 1, the vehicle 10 generally comprises a cabin structure 20 which, in the case of a SSV, comprises a tubular framework 30 (see FIGS. 5 to 8) to which are mounted protective panels (e.g. door panel 22L, top panel 24, side panel 26L, etc.).

Referring now to FIGS. 2 to 9, the windshield assembly 100 will be described in more details.

The windshield assembly 100 is configured to be mounted to the vehicle 10 to provide protection to the driver, operator and/or passenger(s). In the present embodiment, the windshield assembly 100 is more particularly configured to be mounted to the tubular framework 30 of the cabin structure 20 of the vehicle 10.

Referring more particularly to FIGS. 2 to 8, the windshield assembly 100 generally comprises a pair of right and left guide rails 110R and 110L, a flexible windshield panel 130, and three transversal support members 140, 150 and 160.

As best shown in FIGS. 5 to 8, the transversal support members 140, 150 and 160 are configured to be mounted to the tubular framework 30 are different locations. The transversal support members 140, 150 and 160 generally provide the proper support for the guide rails 110R and 110L and further insure that the guide rails 110R and 110L are parallel.

Figure 5:
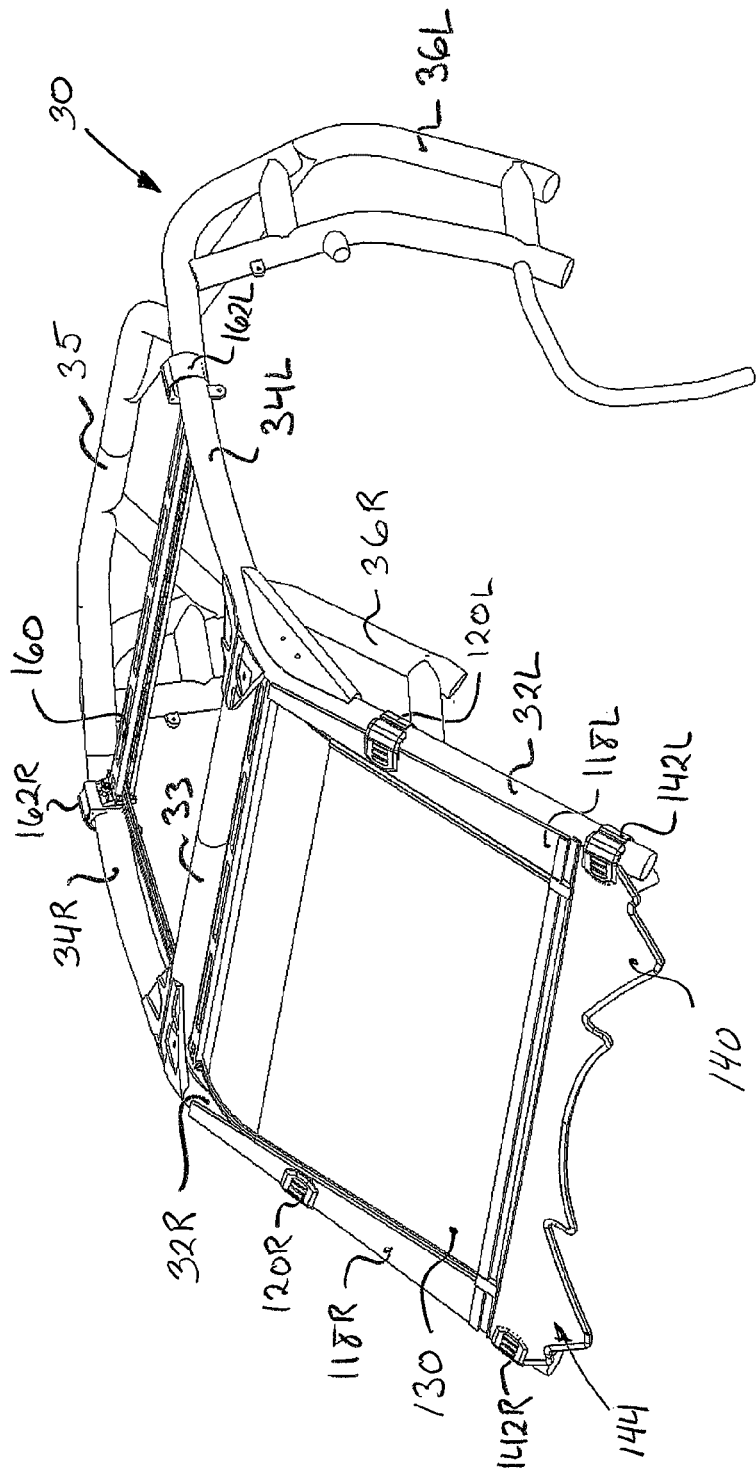
FIG. 5 is a front perspective view of the windshield assembly of FIG. 2 mounted to the tubular framework of the cabin structure of the SSV of FIG. 1, the windshield panel shown in operative position.
Figure 6:
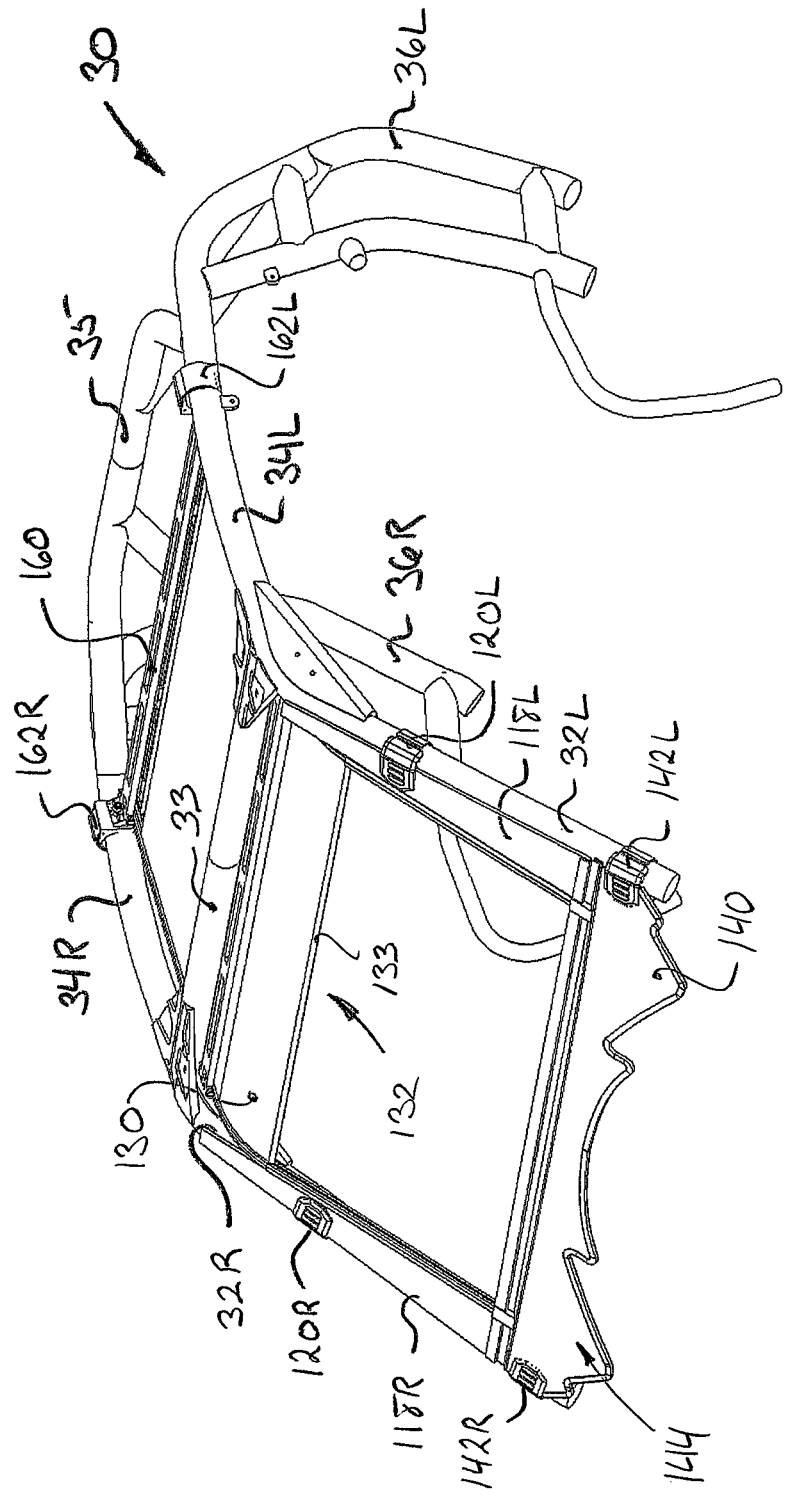
FIG. 6 is a front perspective view of the windshield assembly of FIG. 2 mounted to the tubular framework of the cabin structure of the SSV of FIG. 1, the windshield panel shown in inoperative position.
Figure 7:
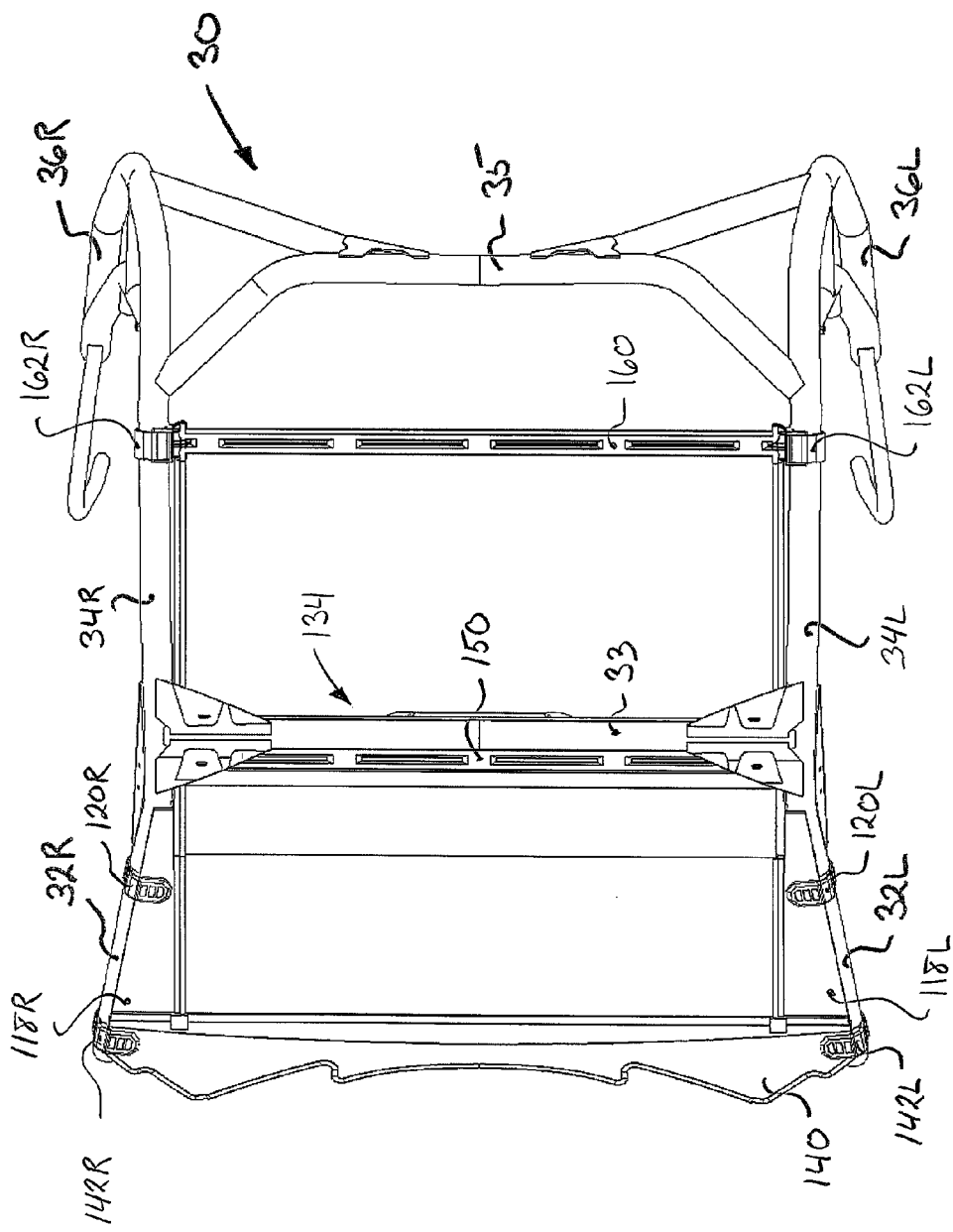
FIG. 7 is a top view of the windshield assembly of FIG. 2 mounted to the tubular framework of the cabin structure of the SSV of FIG. 1, the windshield panel shown in operative position.
Figure 8:
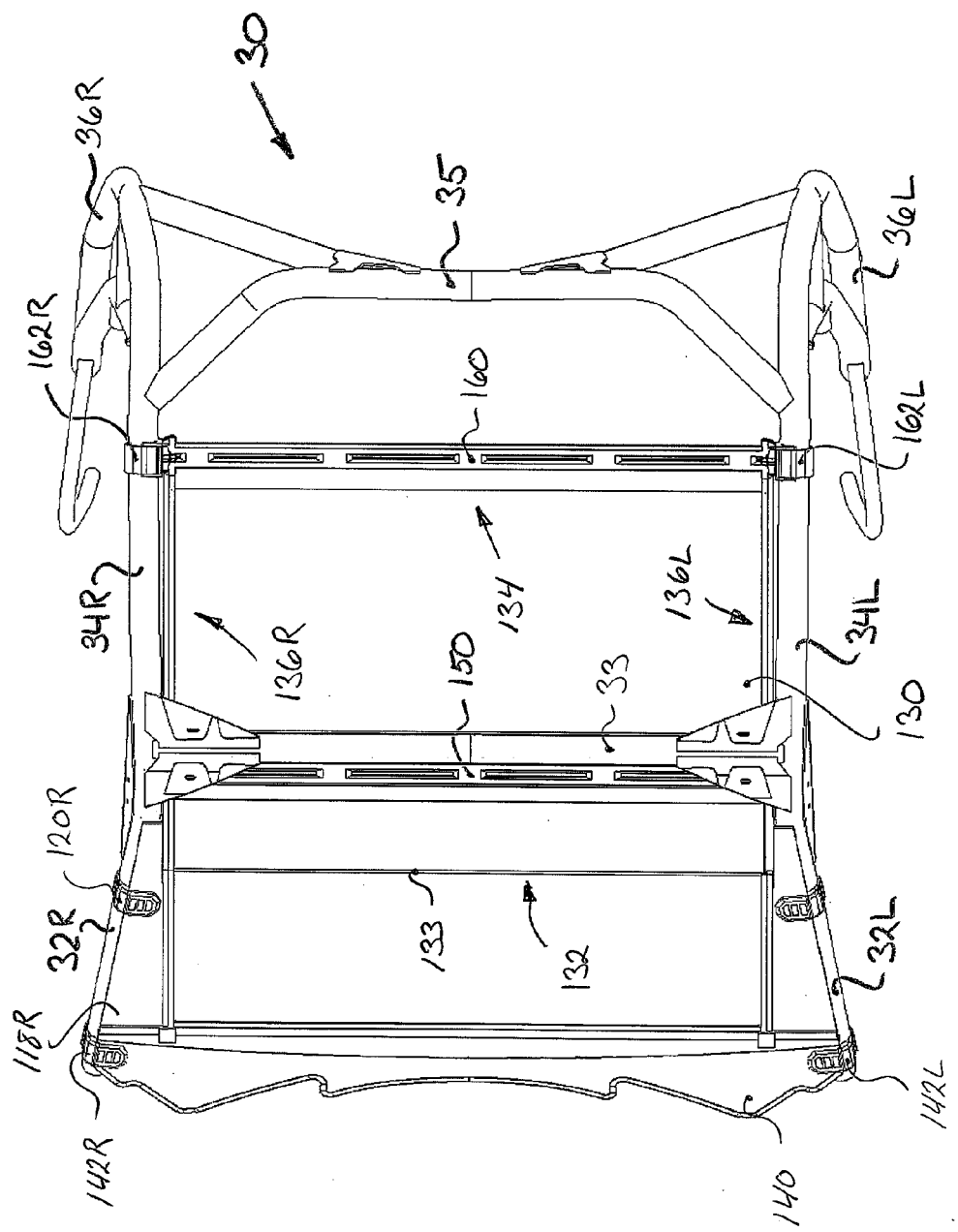
FIG. 8 is a top view of the windshield assembly of FIG. 2 mounted to the tubular framework of the cabin structure of the SSV of FIG. 1, the windshield panel shown in inoperative position.

As shown in FIGS. 5 and 6, the first or front support member 140 is configured to be mounted to the lower portion of the front side posts 32R and 32L of the tubular framework 30. In the present embodiment, the front support member 140 is mounted to the lower portion of the front side posts 32R and 32L of the tubular framework 30 with quick-release clamps 142R and 142L to allow quick installation and removal of the windshield assembly 100. Also, in the present embodiment, the front support member 140 is further configured as a fixed partial windshield 144. In that sense, this partial windshield 144 provides minimal protection when the windshield panel 130 is in the inoperative position. In other embodiments, the partial windshield 144 could be mounted to the front support member 140.

Figure 9:
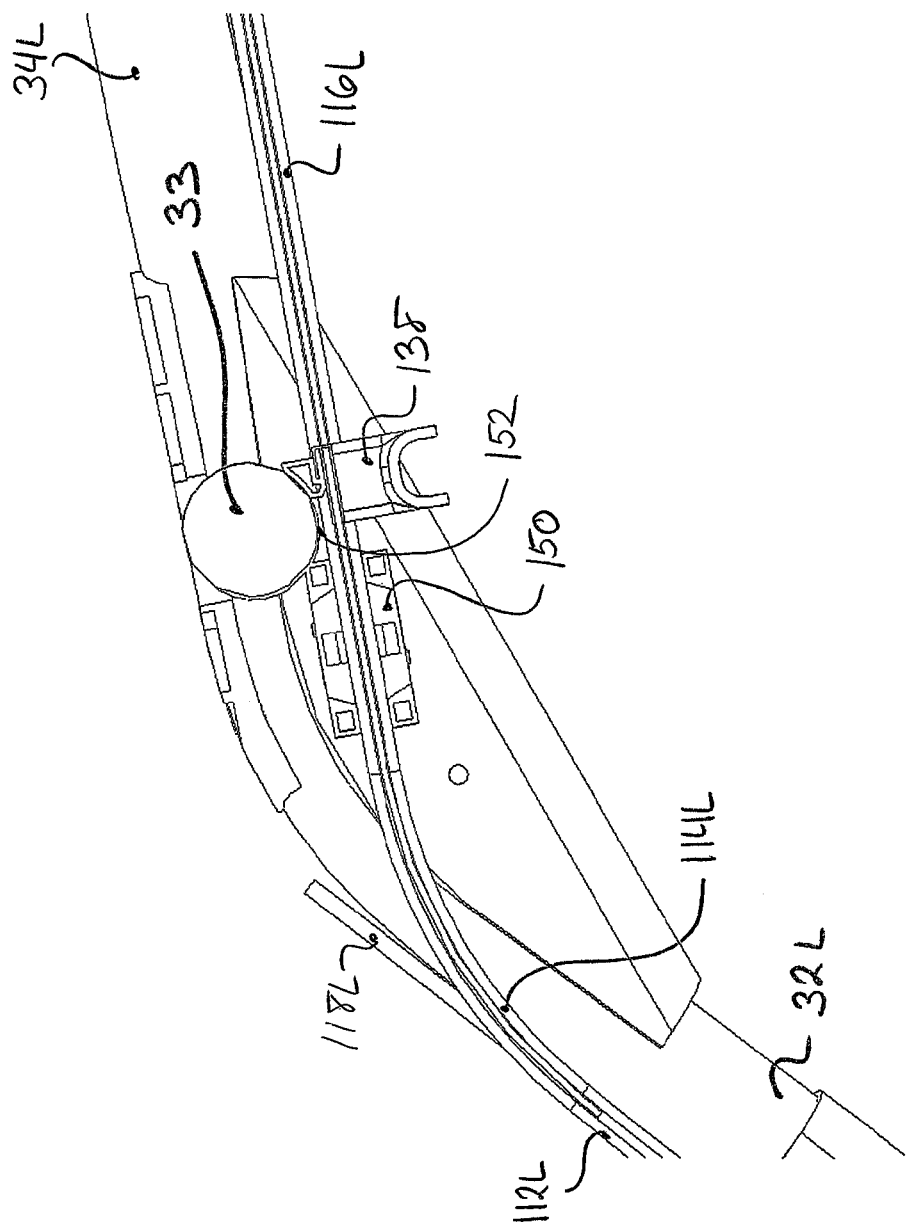
FIG. 9 is an enlarged side view of the curved portion of the windshield assembly of FIG. 2.

With additional reference to FIG. 9, the second or intermediate support member 150 is not directly mounted to the tubular framework 30. In fact, in the present embodiment, the intermediate support member 150 is configured to generally abut under the front transverse post 33 of the tubular framework 30. This arrangement is best shown in FIG. 9 which shows that the intermediate support member 150 comprises a semi-circular recessed portion 152 to receive the front transverse post 33. In the present embodiment, the intermediate support member 150 does not need to be positively attached to the front transverse post 33 (or to the top side posts 34R and 34L). Indeed, since the guide rails 110R and 110L are rigid, there is no need to push the intermediate support member 150 against the transverse post 33. However, the intermediate support member 150 should be as close as possible of the transverse post 33. Still, in other embodiments, the intermediate support member 150 could be attached to the front transverse post 33 and/or to the top side posts 34R and 34L.

Referring back to FIGS. 5 and 6, the third or rear support member 160 is configured to be mounted to the rear portion of the top side posts 34R and 34L of the tubular framework 30. In the present embodiment, the rear support member 160 is mounted to the rear portion of the top side posts 34R and 34L of the tubular framework 30 with quick-release clamps 162R and 162L to allow quick installation and removal of the windshield assembly 100.

As mentioned above, the front, intermediate and rear support members 140, 150 and 160 provide support for the guide rails 110R and 110L and insure that the guide rails 110R and 110L remain parallel as they extend along the front side posts 32R and 32L and the top side posts 34R and 34L of the tubular framework 30.

The guide rails 110R and 110L are substantially symmetric in nature. Hence, only the guide rail 110L will generally be described. However, the description of guide rail 110L applies equally to guide rail 110R, and vice-versa.

In the present embodiment, guide rail 110L comprises three sections which are connected together during installation of the windshield assembly 100. The three sections comprise a front section 112L, a middle or intermediate section 114L, and a top section 116L. The front section 112L is substantially straight and generally extends along the front left side post 32L of the tubular framework 30. The intermediate section 114L is curved and assure the transition between the front section 112L and the top section 116L. Finally, the top section 116L is also substantially straight and generally extends along the top left side post 34L of the tubular framework 30.

In the present embodiment, the front sections 112R and 112L of the guide rails 110R and 110L are mounted to the front support member 140, the intermediate sections 114R and 114L of the guide rails 110R and 110L are mounted to the intermediate support member 150, and the top sections 116R and 116L of the guide rails 110R and 110L are mounted to the top support member 160.

Also, as best shown in FIGS. 2, 3, 5 and 6, the front sections 112R and 112L of the guide rails 110R and 110L each further respectively comprise small side windshield panels 118R and 118L. These side windshield panel 118R and 118L further respectively comprise quick-release clamps 120R ad 120L to mount the panels to the front side posts 32R and 32L.

As already mentioned above, the windshield assembly 100 comprises a flexible windshield panel 130 slidingly mounted to the guide rails 110R and 110L. The windshield panel 130 is configured to slide along the guide rails 110R and 110L between an operative position or close position (see FIG. 5), and an inoperative position or open position (see FIG. 6). As shown in FIG. 5, in the operative position, the windshield panel 130 is substantially located in front of the driver, operator and/or passenger(s) of the vehicle 10 and its lower edge 132 typically abut on the front support member 140. In the inoperative position, which is shown in FIG. 6, the windshield panel 130 is substantially located in above the driver, operator and/or passenger(s) of the vehicle 10 and thus in the top of the cabin structure 20, and its upper edge 134 typically abuts on the top support member 160.

As can be seen in both FIGS. 5 and 6, whether the windshield panel 130 is in the operative or inoperative positions, a portion of the windshield panel 130 is always extending along the curved intermediate sections 114R and 114L of the guide rails 110R and 110L. By always keeping a portion of the windshield panel 130 curved, the windshield panel 130 exhibits increased rigidity and is less prone to vibration.

To allow the windshield panel 130 to slide along the curved intermediate sections 114R and 114L of the guide rails 110R and 110L, the windshield panel 130 is made from a thin flexible sheet of polymeric material. For instance, in the present embodiment, the windshield panel 130 is made for a sheet of polycarbonate plastic between 1.5 and 3 mm thick. Understandably, the range of thicknesses generally depends on the material used for the windshield panel 130. In other embodiments wherein the windshield panel 130 is made from a different polymer, the range of thicknesses could be different.

Figure 10:
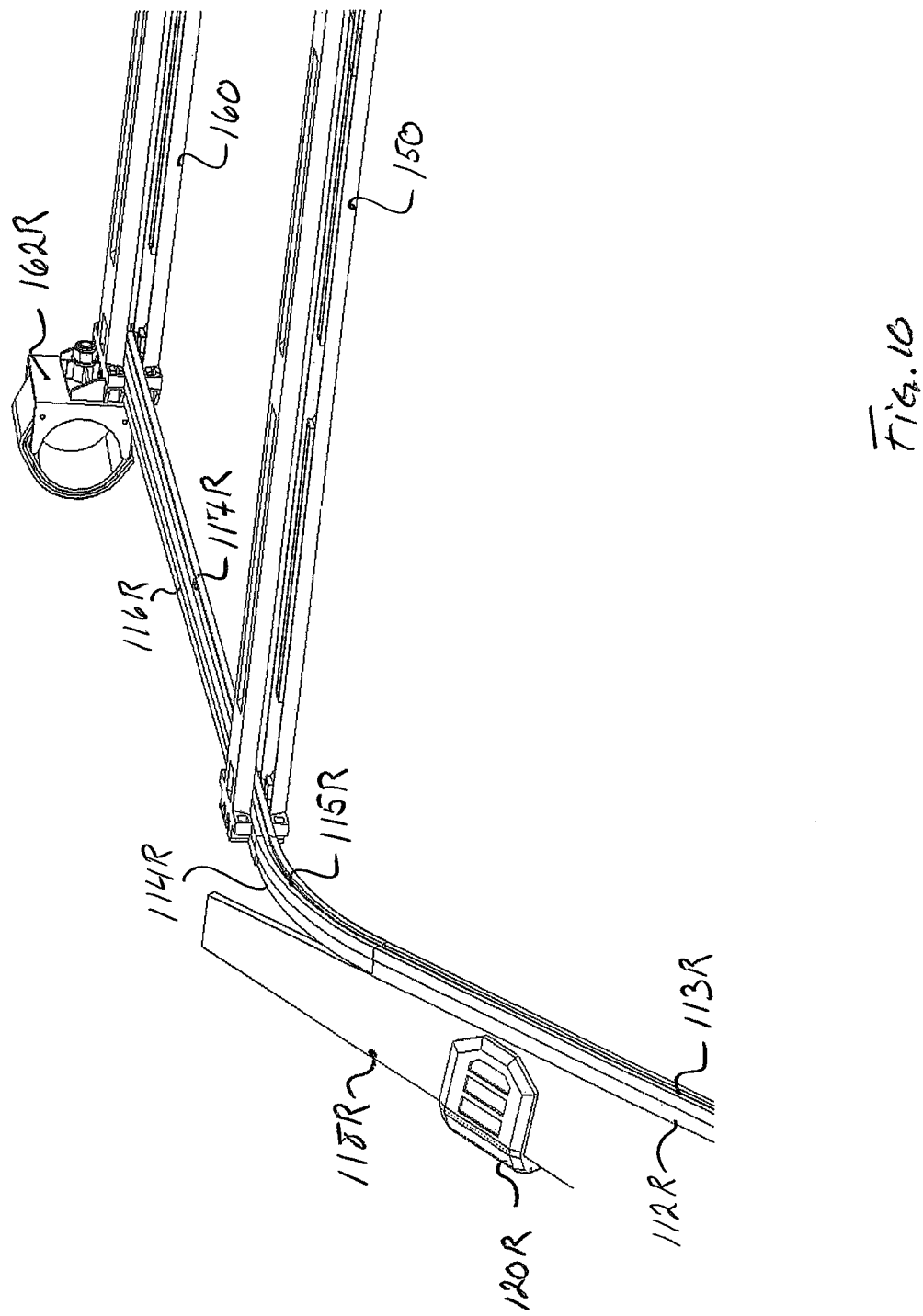
FIG. 10 is an enlarged front perspective view of the right guide rail of the windshield assembly of FIG. 2, without the windshield panel.
Figure 11:
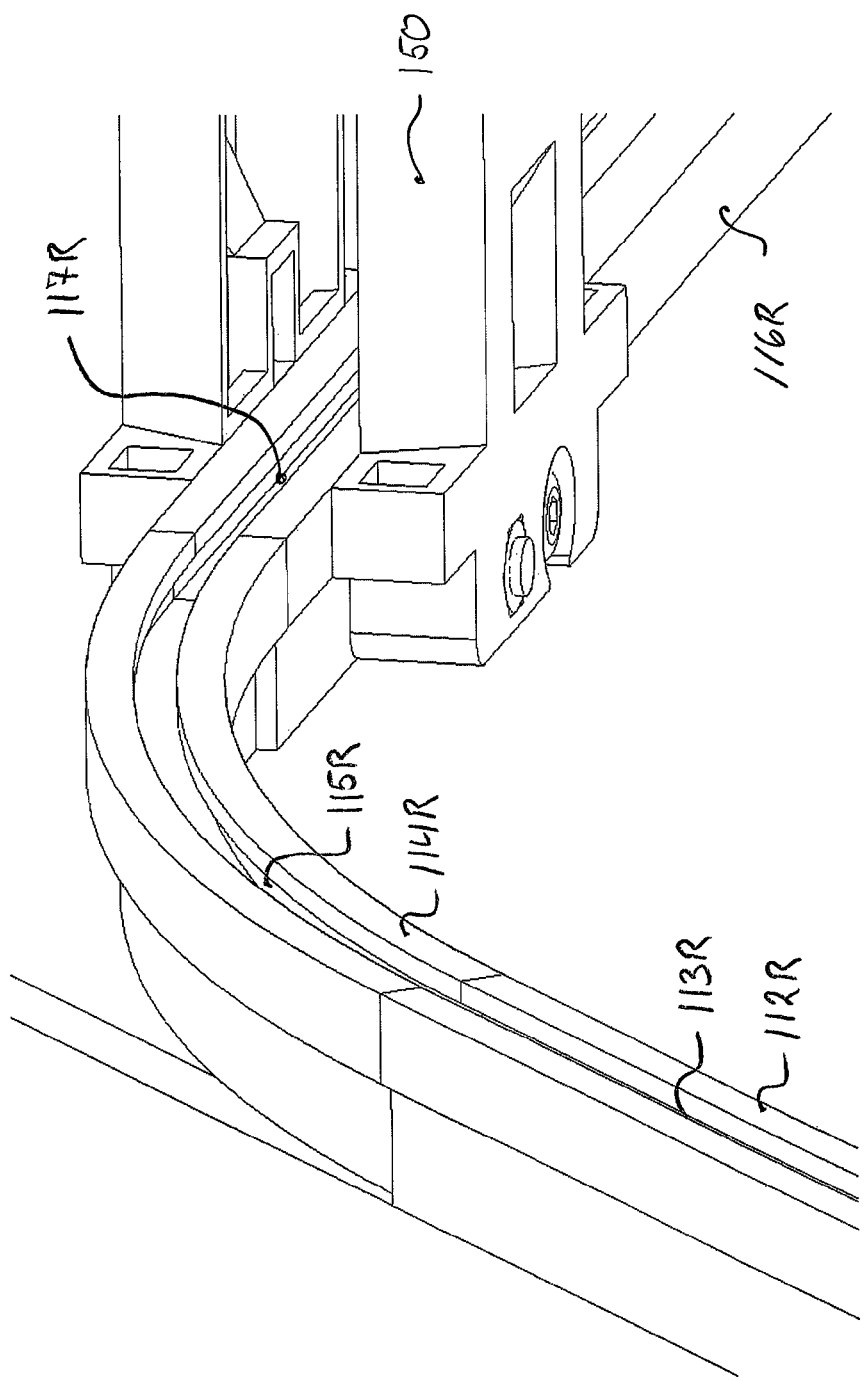
FIG. 11 is a further enlarged front perspective view of the right guide rail of the windshield assembly of FIG. 2, without the windshield panel.
Figure 12:
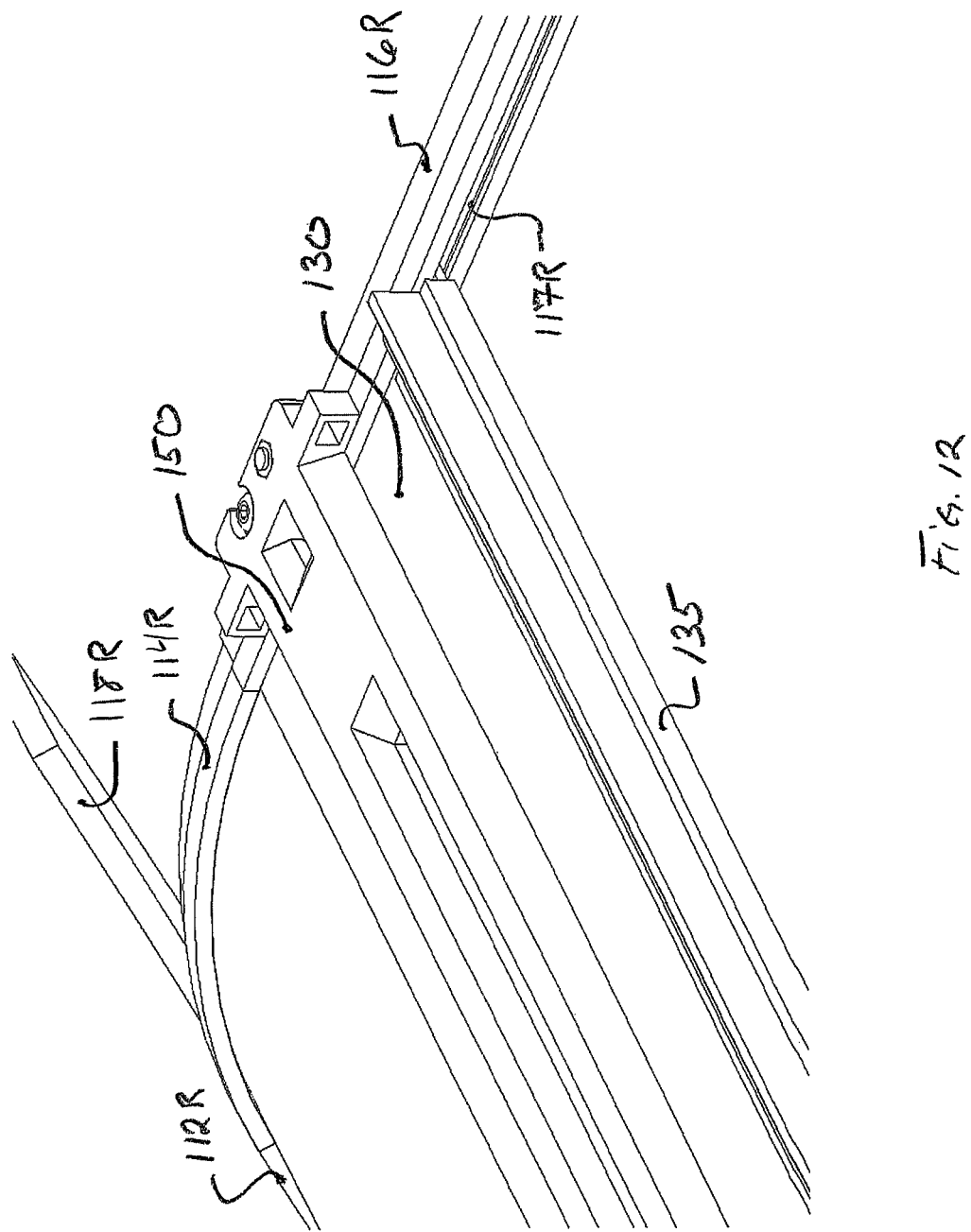
FIG. 12 is an enlarged top rear perspective view of the right guide rail of the windshield assembly of FIG. 2, with the windshield panel.
Figure 13:
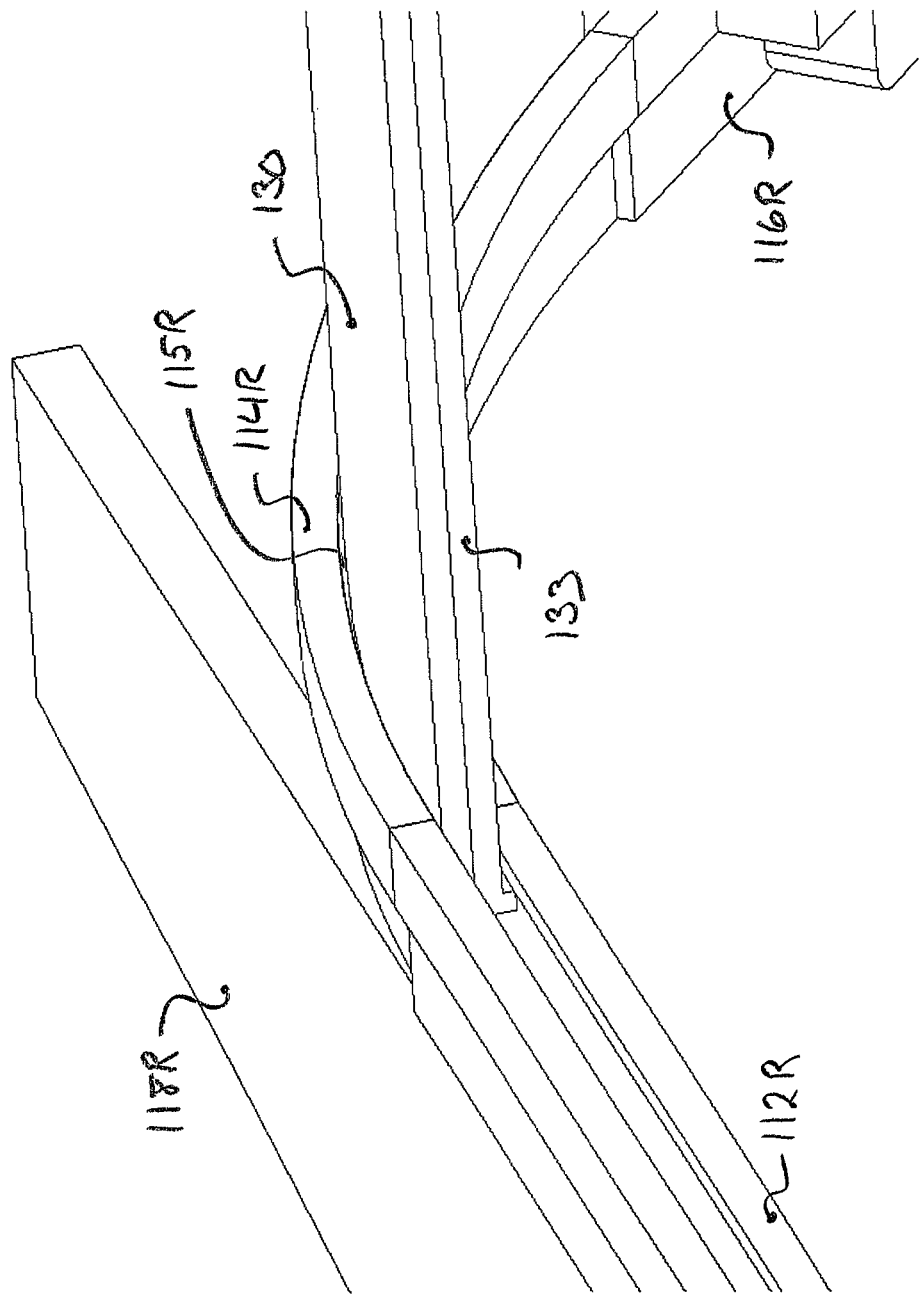
FIG. 13 is another enlarged front perspective view of the right guide rail of the windshield assembly of FIG. 2, with the windshield panel.

Referring now to FIGS. 10 to 13, in the present embodiment, the sliding engagement between the windshield panel 130 and the guide rails 110R and 110L is provided by grooves located in the sections of the guide rails 110R and 110L and into which the side edges 136R and 136L of the windshield panel 130 are slidingly received. As best shown in FIGS. 10 and 11 for guide rail 110R, front section 112R comprises a groove 113R, intermediate section 114R comprises a groove 115R, and top section 116R comprises a groove 117R. Understandably, as shown in FIG. 11, when all three sections 112R, 114R and 116R are assembled, all three grooves 113R, 115R and 117R form a single continuous groove extending along the guide rail 110R and into which the windshield panel 130 can slide. Also, though not shown, sections 112L, 114L and 116L of guide rail 110L comprise matching grooves.

Though not shown for clarity, the grooves could be provided with layers of low-friction or gliding material (e.g. felt), to allow the windshield panel 130 to easily slide along the guide rails 110R and 110L.

To allow the driver, operator and/or passenger of the vehicle 10 to slide the windshield panel 130 between the operative and inoperative positions, the upper edge 134 of the windshield panel 130 is provided with a handle 138. In other embodiments, the lower edge 132 of the windshield panel 130 could also, or alternatively, be provided with a handle.

The lower edge 132 and the upper edge 134 of the windshield panel 130 are respectively provided with cushioning bands 133 and 135 typically made of elastomeric material. These cushioning bands 133 and 135 generally prevent the windshield panel 130 from directly contacting the front support member 140 (when the windshield panel 130 is in the operative position) or the top support member 160 (when the windshield panel 130 is in the inoperative position) and further prevent vibration. Also, when the windshield panel 130 is in the operative position, the cushioning band 133 provides a tight seal with the fixed windshield panel 144.

Once properly installed to the cabin structure 20 of the vehicle 10, the windshield assembly 100 in accordance of the principles of the present invention allows the driver, operator and/or passenger of the vehicle 10 to easily slide the windshield panel 130 between the operative and inoperative positions as needed according to the conditions in which the vehicle 10 is operated.

Figure 14:
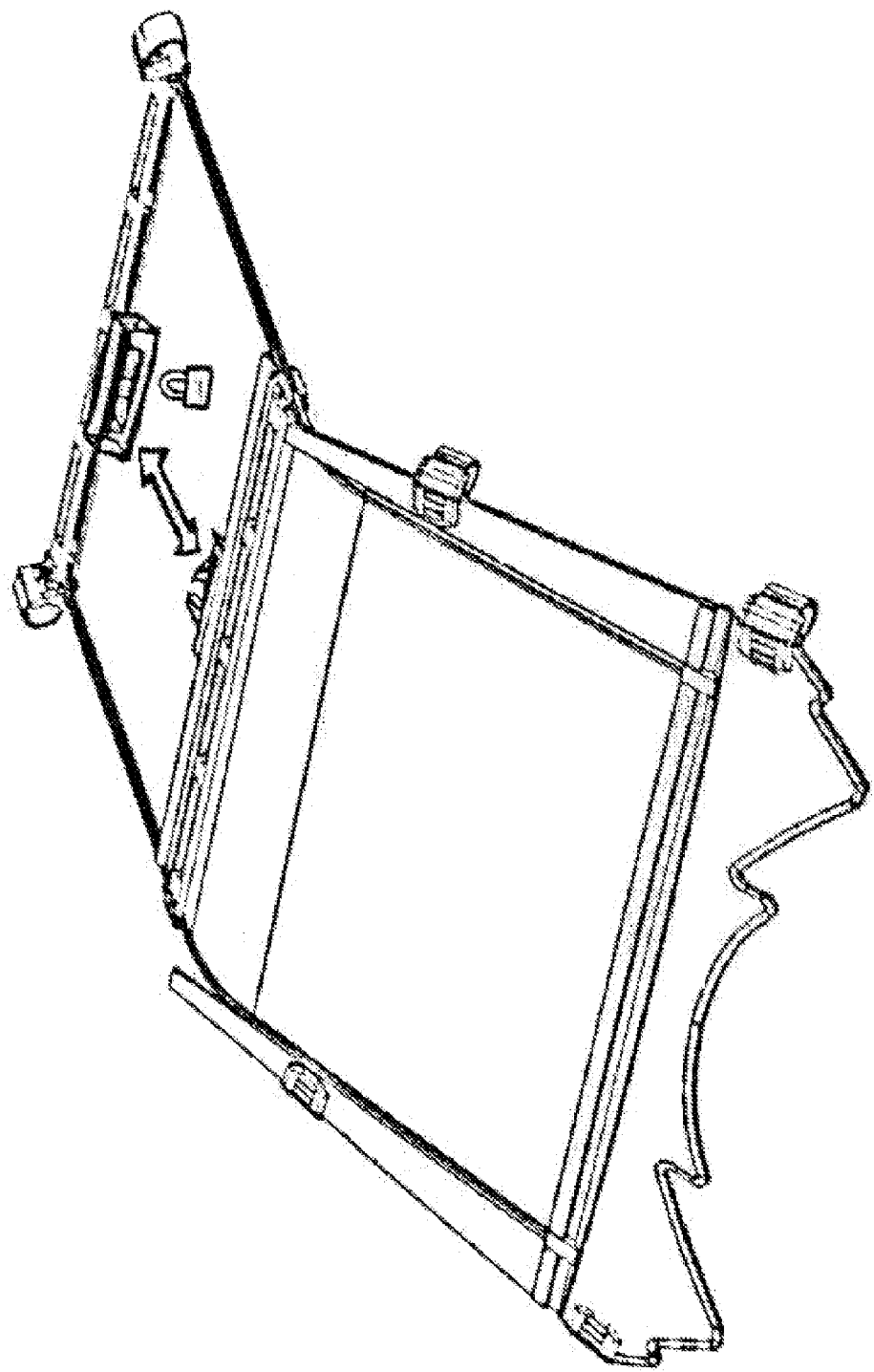
FIG. 14 is a front perspective view of another embodiment of the windshield assembly in accordance with the principles of the present invention, comprising complementary locking mechanisms.

Referring to FIG. 14, in a variant of the present embodiment, the upper edge of the windshield panel and the top support member comprise complementary locking mechanisms to allow the windshield panel to be locked into the inoperative position. The locking mechanisms prevent the windshield panel from accidentally sliding back into the operative position (when the vehicle is operated over very rough terrain for instance).

Figure 15:
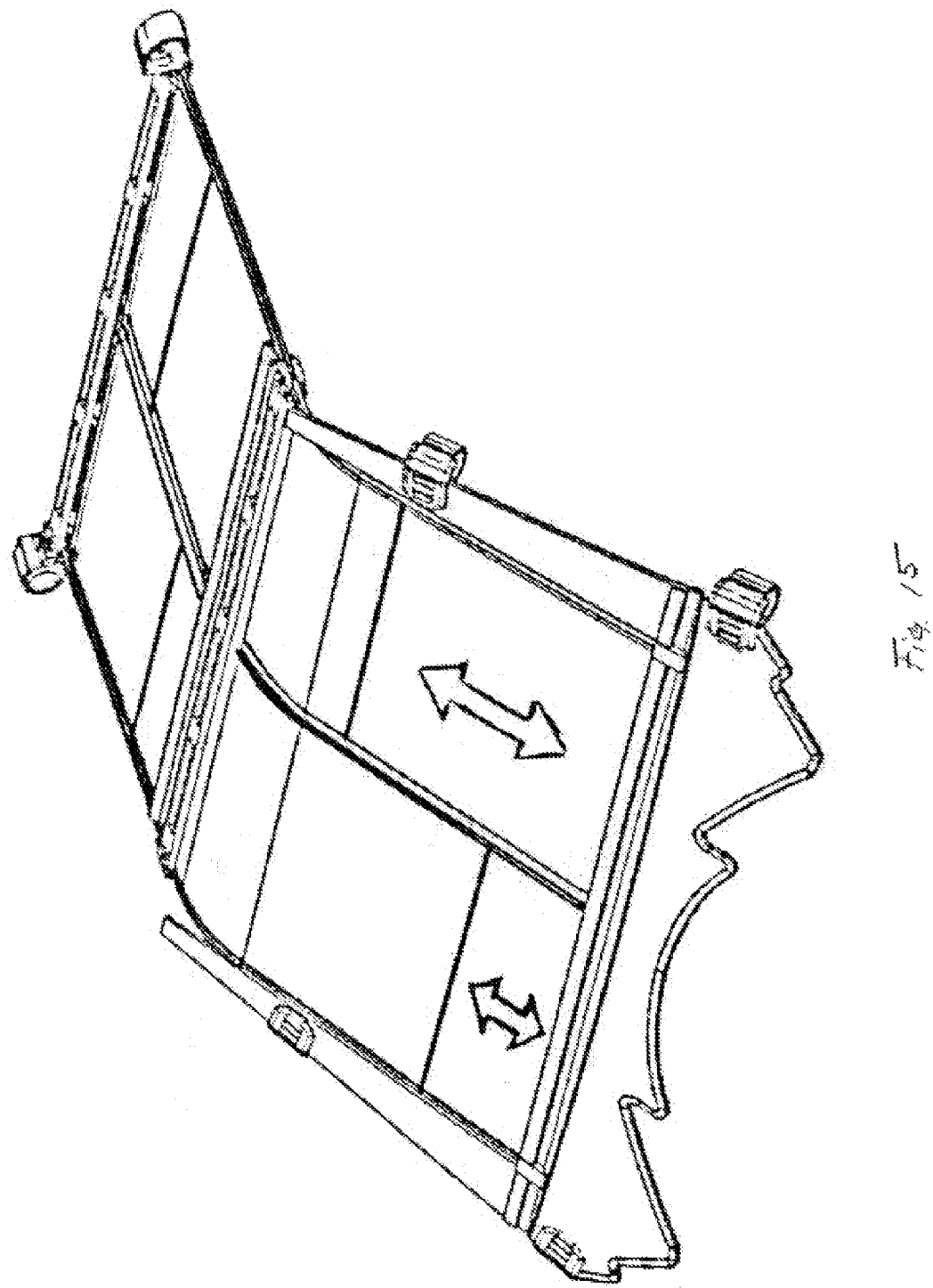
FIG. 15 is a front perspective view of another embodiment of the windshield assembly in accordance with the principles of the present invention, comprising two independently slidable windshield panels.

Referring to FIG. 15, in another variant, the windshield assembly comprises two independently slidable windshield panels. In this variant, the driver/operator and the passenger can independently slide their respective windshield panel between the operative and inoperative positions.

Figure 16:
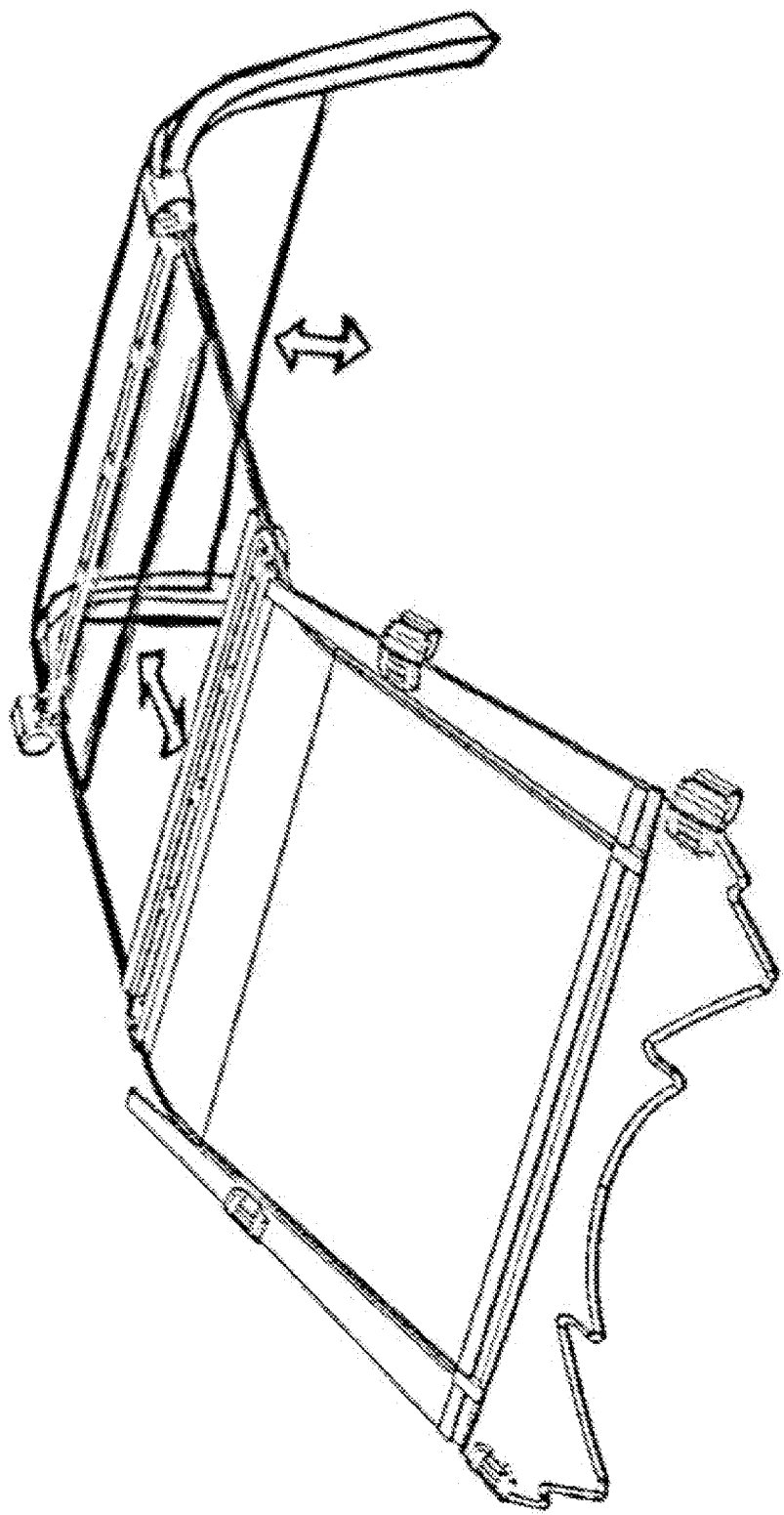
FIG. 16 is a front perspective view of another embodiment of the windshield assembly in accordance with the principles of the present invention, comprising a rear windshield panel.

Referring to FIG. 16, in yet another variant, windshield assembly further comprises a rear windshield panel. In this variant, the guide rails can either extend all the way from the front to the rear of the cabin structure or can be split into a generally front set of rails and a generally rear set of rails.

Figure 17:
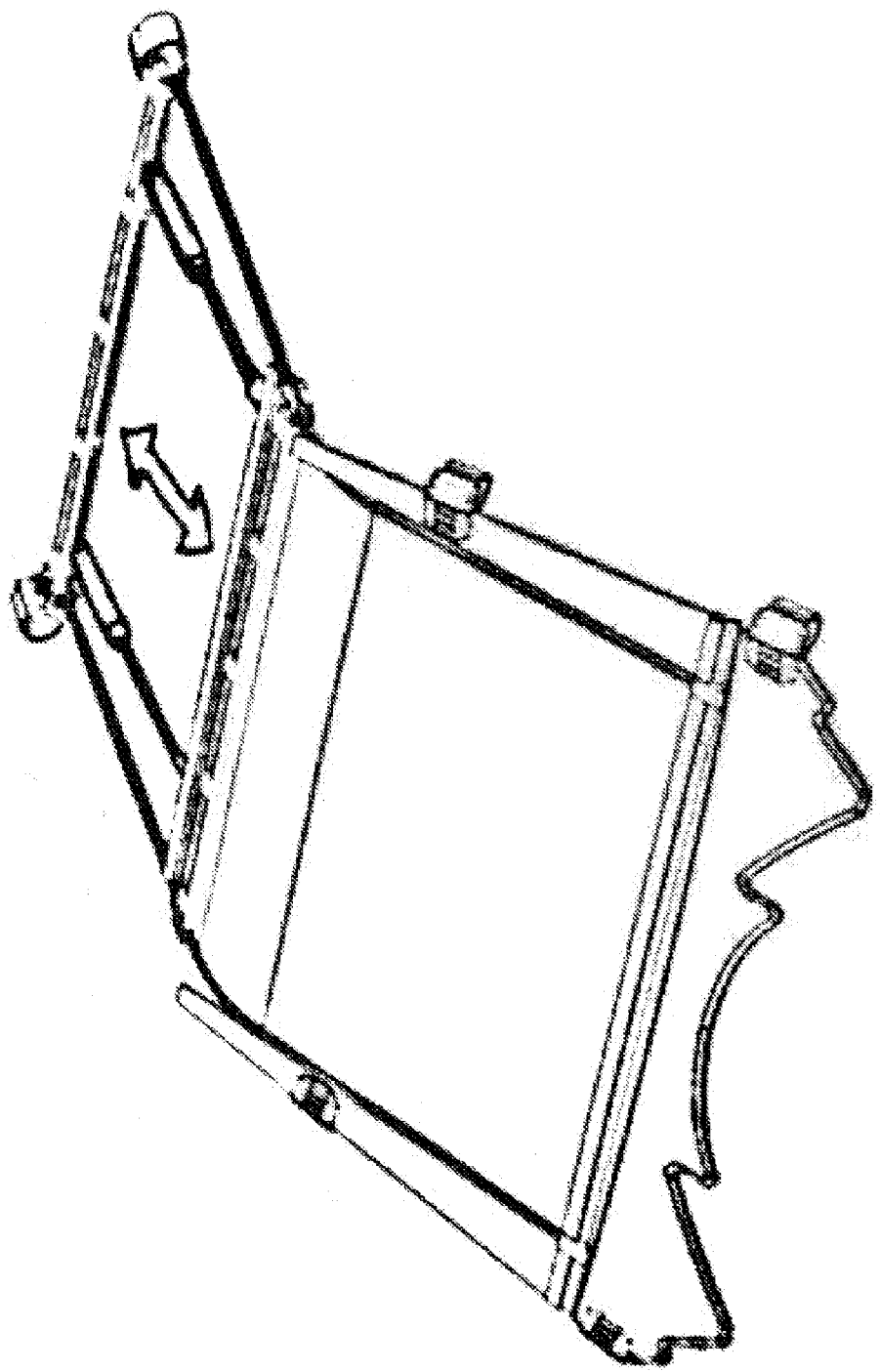
FIG. 17 is a front perspective view of another embodiment of the windshield assembly in accordance with the principles of the present invention.
Figure 18:
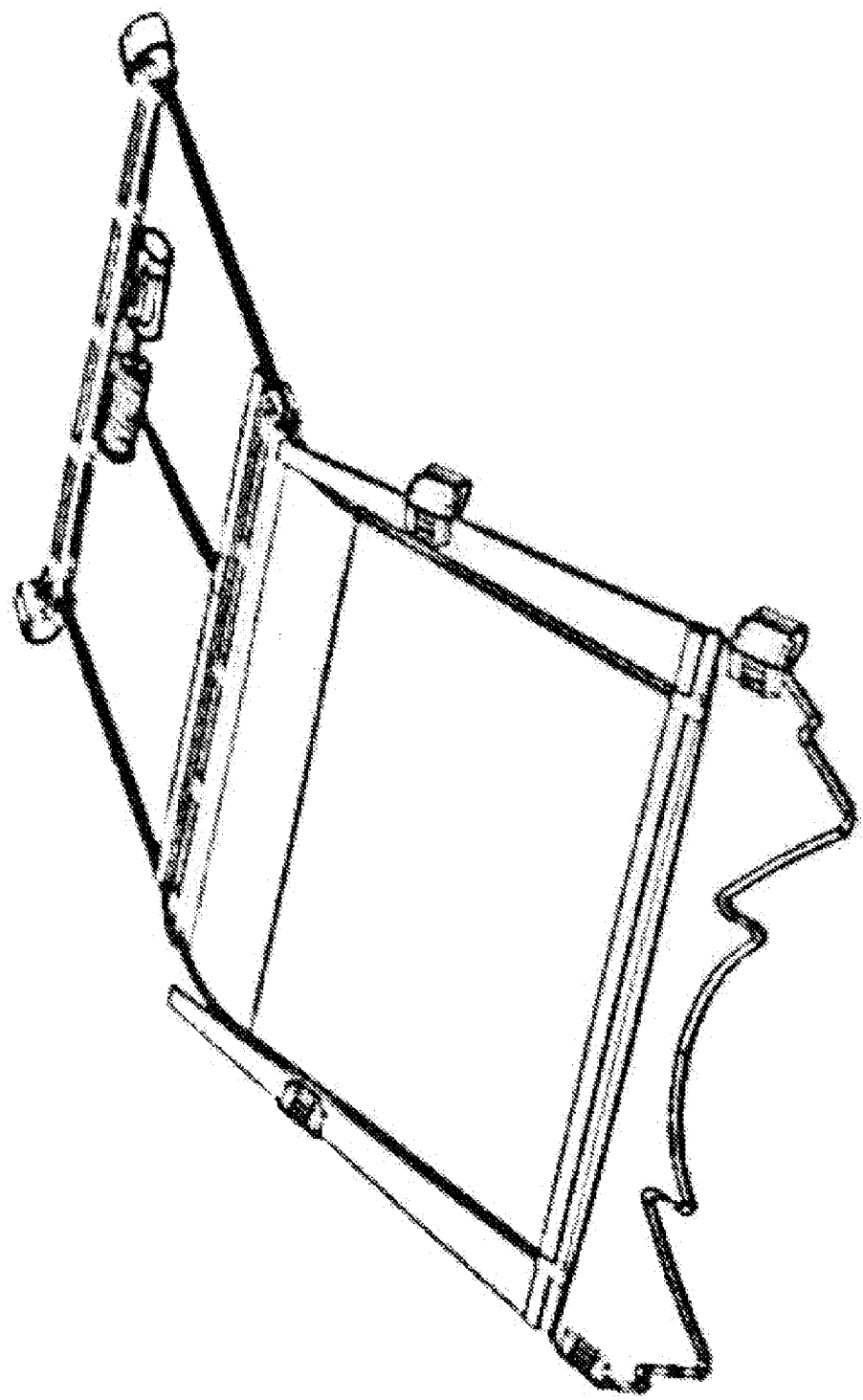
FIG. 18 is a front perspective view of another embodiment of the windshield assembly in accordance with the principles of the present invention.
Figure 19:
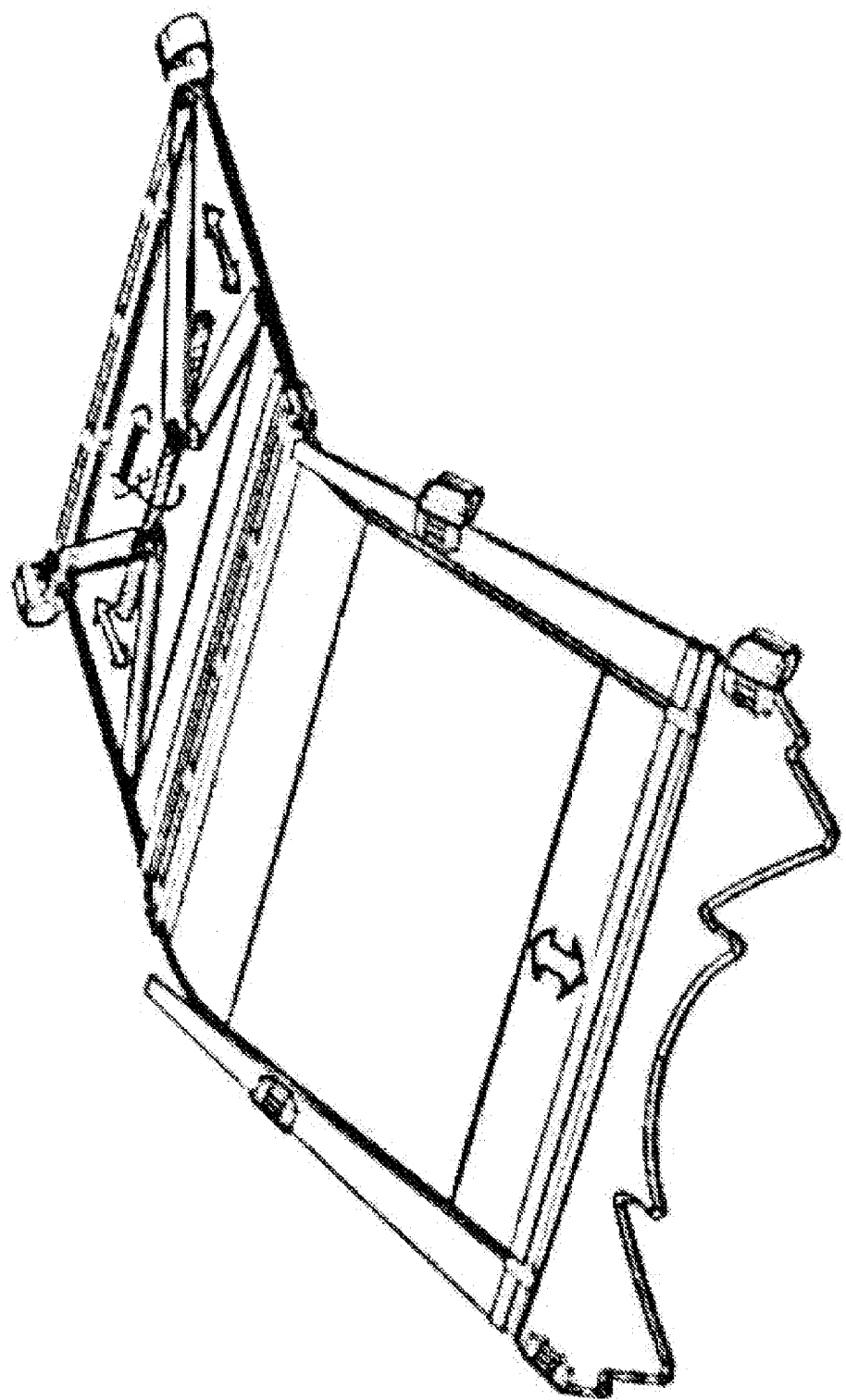
FIG. 19 is a front perspective view of another embodiment of the windshield assembly in accordance with the principles of the present invention.

Referring to FIGS. 17 to 19, in still other variants, the movement of the windshield panel along the guide rails is assisted with an assisting mechanism. The movement can be partially or fully controlled, pneumatically, e.g. with pistons (see FIG. 17), electromechanically, e.g. with a winch (see FIG. 18), or mechanically, with a crank and linkages (see FIG. 19). The assisting mechanism can be motorized.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A windshield assembly for a vehicle comprising a cabin structure having side edges, the windshield assembly comprising:
   at least two guide rails configured to be mounted to the side edges and to slidingly receive side edges of at least one flexible windshield panel, the flexible windshield panel comprising polymeric material;
   the flexible windshield panel being slidingly mounted to the guide rails and configured to slide within grooves of the guide rails between an operative position and an inoperative position;
   each guide rail comprising;
   a first generally straight portion extending along a front portion of the cabin structure;
   a second generally straight portion extending along a top portion of the cabin structure; and
   a curved portion interconnecting the first and second portions;
   wherein a portion of the flexible windshield panel is always extending along the curved portion.

2. The windshield assembly of claim 1, wherein the windshield panel comprises polycarbonate.

3. The windshield assembly of claim 1, further comprising transverse support members configured to be mounted to the cabin structure of the vehicle.

4. The windshield assembly of claim 1, wherein, in the operative position, the flexible windshield panel is substantially located at a front portion of the cabin structure and wherein a lower edge of the flexible windshield panel abuts a front support member of the cabin structure.

5. The windshield assembly of claim 1, wherein, in the inoperative position, the flexible windshield panel is substantially located on a top portion of the cabin structure and an upper edge of the flexible windshield panel abuts a top support member of the cabin structure.

6. The windshield assembly of claim 1, wherein a lower edge and the upper edge of the flexible windshield panel respectively comprise cushioning bands.

7. The windshield assembly of claim 6, wherein the cushioning bands are made of elastomeric material.

8. The windshield assembly of claim 1, wherein the windshield assembly comprises two flexible windshield panels and a double-side guide rail between the side edges of the cabin structure, each flexible windshield panel being slidably mounted to one of the guide rails mounted to a side edge and to one side of the double-side guide rail.

9. The windshield assembly of claim 1, further comprising at least one handle.

10. The windshield assembly of claim 1, further comprising a first locking mechanism mounted to a top support member of the cabin structure and a second complementary locking mechanism mounted to an upper edge of the windshield panel, the first and second locking mechanisms being configured to lock the windshield panel into the inoperative position.

11. The windshield assembly of claim 1, wherein the at least two guide rails extend to a rear portion of the cabin structure and wherein the windshield assembly further comprise a rear flexible windshield panel slidingly mounted to the guide rails and configured to slide between an operative position and inoperative of the rear flexible windshield panel.

12. The windshield assembly of claim 1, wherein the windshield assembly further comprises at least two rear guide rails mounted to side edges of the rear portion of the cabin structure and wherein the windshield assembly further comprises a rear flexible windshield panel slidingly mounted to the rear guide rails and configured to slide between an operative position and inoperative of the rear flexible windshield panel.

13. The windshield assembly of claim 1, further comprising an assisting mechanism operatively connected to the flexible windshield panel for assisting the sliding movement of the flexible windshield panel.

14. The windshield assembly of claim 1, wherein the vehicle is an off-road vehicle.

15. The windshield assembly of claim 14, wherein the off-road vehicle is a utility-terrain vehicle or a side-by-side vehicle.

\* \* \* \* \*